US009516661B2

(12) United States Patent
Hadef et al.

(10) Patent No.: US 9,516,661 B2
(45) Date of Patent: Dec. 6, 2016

(54) METHOD AND APPARATUS FOR SCHEDULING RESOURCES AT RELAY STATION (RS) IN MOBILE COMMUNICATION NETWORK

(71) Applicant: Samsung Electronics Co., Ltd., Suwon-si (KR)

(72) Inventors: Mahmoud Hadef, Staines (GB); Jim O'Reilly, Staines (GB); Kwang Taik Kim, Yongin-si (KR); Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 14/452,770

(22) Filed: Aug. 6, 2014

(65) Prior Publication Data
US 2015/0043423 A1 Feb. 12, 2015

(30) Foreign Application Priority Data

Aug. 7, 2013 (GB) .................................. 1314174.2
Feb. 18, 2014 (KR) ........................ 10-2014-0018461

(51) Int. Cl.
*H04W 4/00* (2009.01)
*H04W 72/08* (2009.01)
(Continued)

(52) U.S. Cl.
CPC ............. *H04W 72/085* (2013.01); *H04B 7/14* (2013.01); *H04L 5/0044* (2013.01);
(Continued)

(58) Field of Classification Search
CPC ....... H04B 7/14; H04B 7/2121; H04B 7/2123; H04W 72/085; H04W 72/12311; H04W 72/1231; H04W 72/1252; H04W 84/047; H04L 5/0094; H04L 5/044; H04L 5/0053; H04L 5/0057; H04J 2203/0069; H04Q 2213/394
(Continued)

(56) References Cited

U.S. PATENT DOCUMENTS 6,987,738 B2 * 1/2006 Subramanian ...... H04L 12/5693
370/252
8,649,731 B2 * 2/2014 Onodera ................ H04B 7/155
370/315

(Continued)

FOREIGN PATENT DOCUMENTS

EP        2 448 354 A1     5/2012

OTHER PUBLICATIONS

Extended European Search Report mailed Jan. 12, 2015 in European Patent Application No. 14179778.7 (8 pages).

*Primary Examiner* — Chuong T Ho
(74) *Attorney, Agent, or Firm* — NSIP Law

(57) ABSTRACT

A Relay Station (RS), and a corresponding method of performing scheduling at an RS in a mobile communication network are provided. The RS and corresponding method receive channel state information and scheduling information from an apparatus associated with the RS, the scheduling information defining scheduling parameters for downlink transmission of data. The RS and corresponding method also obtain updated scheduling parameters based on the scheduling information, the channel state information, and an amount of the data.

25 Claims, 9 Drawing Sheets

(51) Int. Cl.
*H04B 7/14* (2006.01)
*H04W 72/12* (2009.01)
*H04L 5/00* (2006.01)
*H04W 84/04* (2009.01)

(52) U.S. Cl.
CPC ....... *H04L 5/0094* (2013.01); *H04W 72/1231* (2013.01); *H04L 5/0053* (2013.01); *H04L 5/0057* (2013.01); *H04W 72/1252* (2013.01); *H04W 84/047* (2013.01)

(58) Field of Classification Search
USPC .............................. 370/315, 329, 330; 455/7
See application file for complete search history.

(56) References Cited

U.S. PATENT DOCUMENTS

| | | | |
|---|---|---|---|
| 9,107,228 B2* | 8/2015 | Pitakdumrongkija | H04B 7/15 |
| 2004/0192204 A1 | 9/2004 | Periyalwar et al. | |
| 2006/0270341 A1 | 11/2006 | Kim et al. | |
| 2007/0081507 A1 | 4/2007 | Koo et al. | |
| 2008/0045141 A1* | 2/2008 | Suga | H04W 84/047 455/7 |
| 2008/0227461 A1 | 9/2008 | Dayal et al. | |
| 2009/0227201 A1 | 9/2009 | Imai et al. | |
| 2010/0069082 A1* | 3/2010 | Kim | H04B 7/15507 455/452.2 |
| 2010/0202306 A1* | 8/2010 | Jersenius | H04B 17/0067 370/252 |
| 2011/0097994 A1* | 4/2011 | Onodera | H04B 7/155 455/7 |
| 2011/0122807 A1* | 5/2011 | Onodera | H04B 7/15542 370/315 |
| 2011/0170513 A1* | 7/2011 | Seo | H04W 72/1284 370/329 |
| 2011/0305190 A1 | 12/2011 | Seki | |
| 2012/0094682 A1 | 4/2012 | Ode et al. | |
| 2012/0195252 A1* | 8/2012 | Suga | H04B 7/15528 370/315 |
| 2012/0207120 A1* | 8/2012 | Bark | H04L 5/0064 370/329 |
| 2012/0236782 A1 | 9/2012 | Bucknell et al. | |
| 2012/0243462 A1* | 9/2012 | Bucknell | H04B 7/155 370/315 |
| 2012/0244796 A1 | 9/2012 | Ando et al. | |
| 2014/0219115 A1* | 8/2014 | Etemad | H04W 28/12 370/252 |
| 2014/0321376 A1* | 10/2014 | Damnjanovic | H04W 72/1215 370/329 |

* cited by examiner

METHOD AND APPARATUS FOR SCHEDULING RESOURCES AT RELAY STATION (RS) IN MOBILE COMMUNICATION NETWORK

CROSS-REFERENCE TO RELATED APPLICATIONS

This application claims the benefit under 35 USC 119(a) of British Patent Application No. 1314174.2, filed on Aug. 7, 2013, in the United Kingdom Intellectual Property Office, and Korean Patent Application No. 10-2014-0018461, filed on Feb. 18, 2014, in the Korean Intellectual Property Office, the entire disclosures of which are incorporated herein by reference for all purposes.

BACKGROUND

1. Field

The following description relates to a method and an apparatus to schedule resources in a mobile communication network, and more particularly, to scheduling resources at a Relay Station (RS) in a relay-based network.

2. Description of Related Art

Mobile communication networks enable data to be transmitted wirelessly between base stations (BS) and a mobile apparatus, for example a mobile phone, a laptop, and a tablet computer. In the last decade, relay-based networks have been developed to enhance a coverage of a network and to improve overall system throughput and energy efficiency. In a relay-based network, a relay station (RS) relays control signals and/or data between a BS and a mobile station (MS). Multi-relay-assisted communication has been standardized, for example in both Fourth Generation (4G) Long Term Evolution (LTE)-Advanced and Worldwide Interoperability for Microwave Access (WiMAX) based on the Institute of Electrical and Electronics Engineers (IEEE) 802.16m mobile broadband communication systems.

Scheduling of resources between MSs in the network is an important task that may significantly impact the overall system performance. For example, in an Orthogonal Frequency Division Multiple Access (OFDMA) network, such as a 4G LTE network or a WiMAX network, scheduling is performed to allocate available orthogonal subcarriers to MSs, and to identify most appropriate modulation (MOD) and channel coding (COD) schemes for each of the MSs.

A scheduling process may be performed based on a large number of parameters, including feedback information provided by involved nodes, for example MSs and RSs, which quantify a status of a wireless channel between two nodes within the network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method to perform scheduling at a relay station (RS), the method including receiving channel state information and scheduling information from an apparatus associated with the RS, the scheduling information defining scheduling parameters for downlink transmission of data; and obtaining updated scheduling parameters based on the scheduling information, the channel state information, and an amount of the data.

The obtaining may include identifying available scheduling parameters that require an amount of data that is less than or equal to the amount of the data; and selecting the updated scheduling parameters from among the available scheduling parameters based on a predetermined condition.

The selecting may include at least one of selecting the updated scheduling parameters that provide a maximum throughput from among the available scheduling parameters; and selecting the updated scheduling parameters that provide a determined Quality of Service (QoS).

The method may also include calculating a difference between a current value of a channel quality metric and a previously received value of the channel quality metric, the channel state information including the channel quality metric; and transmitting the difference as channel state information to at least one of a base station (BS) and an intermediate RS.

The method may also include quantizing the channel state information by adjusting the channel state information to one of predefined levels; and transmitting the quantized channel state information to at least one of a base station (BS) and an intermediate RS.

The method may also include selecting at least one of a lower number of the predefined levels for a higher number of hops on a multi-hop chain between a Mobile Station (MS) and a base station (BS), and a lower number of the predefined levels for higher channel fading conditions.

The method may also include obtaining predicted channel state information on a state of a communication channel between the RS and the apparatus in a current time period and based on the received channel state information, wherein the channel state information includes information on a state of the communication channel in a previous time period, and wherein the updated scheduling parameters are obtained based on the predicted channel state information.

The RS may operate based on a decode-and-forward (DF) relay scheme, and wherein the obtaining further includes obtaining a new modulation and coding scheme.

The scheduling information may be used to define a bandwidth (BW) allocated to the apparatus, and the defined BW is retained in response to the updated scheduling parameters being obtained.

The scheduling information may be used to define a bandwidth (BW) allocated to the apparatus, and wherein the obtaining includes obtaining a new BW for the apparatus from BWs re-allocated to apparatuses.

The method may also include receiving downlink data; and adding the downlink data to a buffer, prior to the obtaining of the updated scheduling parameters.

In accordance with an embodiment, there is provided a relay station (RS), including a reception module configured to receive channel state information and scheduling information from an apparatus associated with the RS, the scheduling information defining scheduling parameters for downlink transmission of the data; and a scheduling module configured to obtain updated scheduling parameters based on the scheduling information, the channel state information, and an amount of the data.

The scheduling module may be configured to identify available scheduling parameters that require an amount of data that is less than or equal to the amount of the data, and to select the updated scheduling parameters from among the available scheduling parameters based on a predetermined condition.

The RS may also include a difference calculating module configured to calculate a difference between a current value of a channel quality metric and a previously received value of the channel quality metric, the channel state information including the channel quality metric; and a transmission module configured to transmit the difference as channel state information to at least one of a base station (BS) and an intermediate RS.

The RS may also include a quantization module configured to quantize the channel state information by adjusting the channel state information to one of predefined levels; and a transmission module configured to transmit the quantized channel state information to at least one of a base station (BS) and an intermediate RS.

The quantization module may be configured to select a lower number of the predefined levels for a higher number of hops on a multi-hop chain between a mobile station (MS) and a base station (BS), or a lower number of the predefined levels for higher channel fading conditions.

The RS may also include a prediction module configured to predict channel state information on a state of a communication channel between the RS and the apparatus in a current time period and based on the received channel state information, wherein the channel state information includes information on a state of the communication channel in a previous time period, and wherein the scheduling module is configured to obtain the updated scheduling parameters based on the predicted channel state information.

The RS may be configured to operate based on a decode-and-forward (DF) relay scheme, wherein the scheduling module is configured to obtain a modulation and coding scheme as the updated scheduling parameters, wherein the received scheduling information is used to define a bandwidth (BW) allocated to the apparatus, and wherein the scheduling module is configured to retain the defined BW in response to the updated scheduling parameters being obtained.

The RS may be configured to operate based on an amplify-and-forward (AF) relay scheme, and the scheduling module is configured to obtain a bandwidth (BW) and power allocation in response to the updated scheduling parameters being obtained, or The RS may be configured to operate based on a compress-and-forward (CF) relay scheme, and the scheduling module is configured to obtain the BW and a modulation scheme when the updated scheduling parameters are obtained.

The scheduling module may be configured to obtain the updated scheduling parameters based on a round-robin process, a proportional fairness process, or an adaptive proportional fairness process.

In accordance with an embodiment, there is provided a method of a relay station (RS), including receiving scheduling information and downlink data; receiving channel state information as feedback from a mobile station (MS); updating pre-stored data with the downlink data; obtaining updated scheduling parameters based on the channel state information, the scheduling information, and an amount of the updated data for downlink transmission; and transmitting a portion of the updated data to the MS based on the updated scheduling parameters.

The scheduling information may define scheduling parameters or updated scheduling parameters that are allocated by a base station (BS) or an intermediate RS.

The channel state information may include information on a communication state of a communication channel between the RS and the MS.

The method may also include obtaining predicted channel state information of a state of the communication channel in a current time period, based on the channel state information, wherein the channel state information is predicted based on pre-stored feedback information; and obtaining the updated scheduling parameters based on the predicted channel state information.

The transmitting of the portion of the updated data may include packaging data based on the updated scheduling parameters, and transmitting the packaged data.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
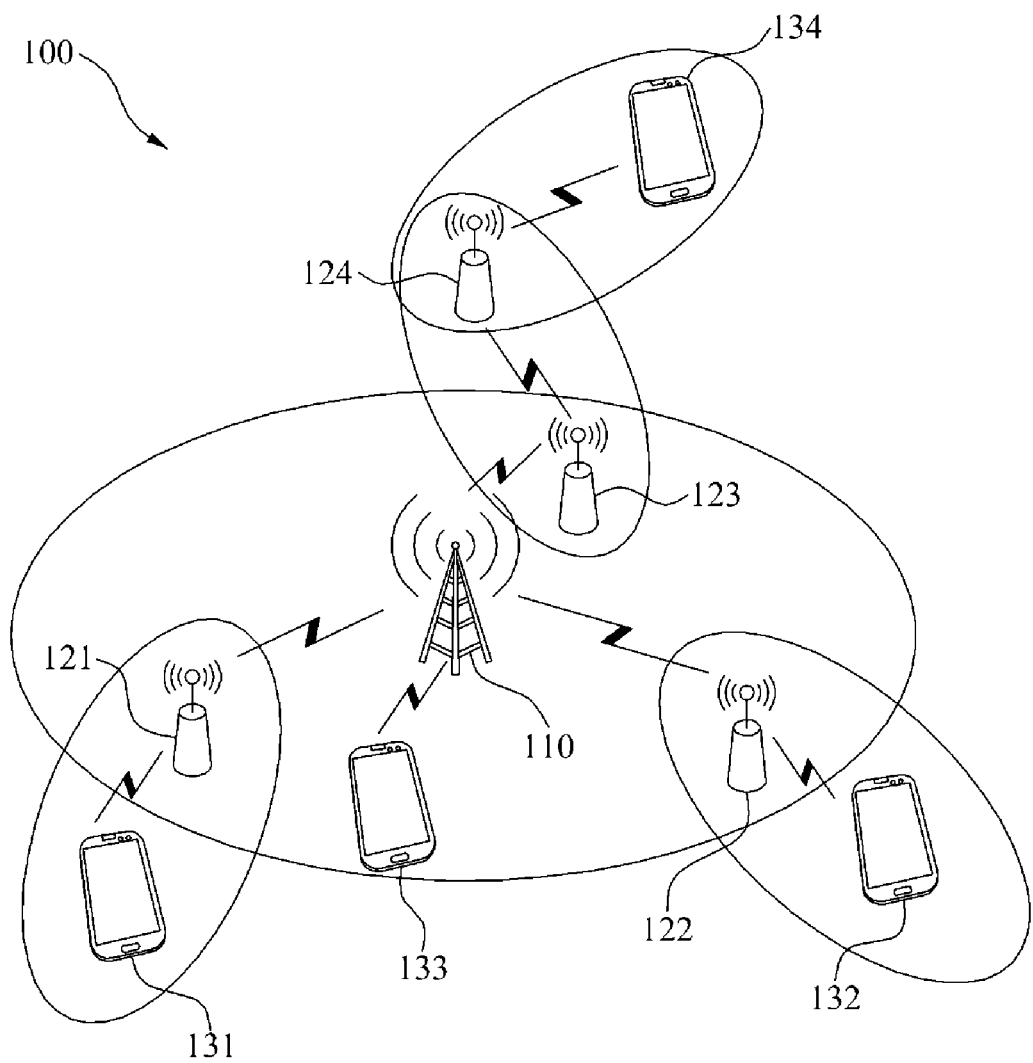
FIG. 1 is a diagram illustrating an example of a mobile communication network, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates a mobile communication network 100, in accordance with an embodiment.

The mobile communication network 100, that is, a relay-based mobile communication network includes a Base Station (BS) 110, a plurality of Relay Stations (RS), for example a first RS 121, a second RS 122, a third RS 123 and a fourth RS 124, and a plurality of Mobile Stations (MS), for example a first MS 131, a second MS 132, a third MS 133 and a fourth MS 134. The plurality of MSs may include, for example, all apparatuses connectable to the mobile communication network 100, for example, a mobile phone, a laptop, a tablet computer, and other types of electronic communication devices. The mobile communication network 100 may also be referred to as a "cellular mobile network," because each of the BS 110 and the first RS 121 to the fourth RS 124 defines a cell in which an MS or an RS is served by a predetermined BS or another RS. An RS associated with an apparatus, for example an MS or another RS, may be referred to as the "serving RS" for the apparatus.

Each of the first MS 131 to the fourth MS 134 in the mobile communication network 100 may be served by the BS 100, by an RS connected to the BS 110, or by an RS connected to the BS 110 through a multi-hop chain including one or more other RSs. Referring to FIG. 1, the BS 110 directly serves the third MS 133. The first RS 121 and the second RS 122 serve the first MS 131 and the second MS 132, which are connected to the BS 110, respectively. The fourth MS 134 is connected to the BS 110 through a multi-hop chain including the third RS 123 and the fourth RS 124. The fourth RS 124 is referred to as a "serving RS" for the fourth MS 134, and the third RS 123 is referred to as an "intermediate RS."

The above-described configuration is not fixed, and links or connections between the first MS 131 to the fourth MS 134, the first RS 121 to the fourth RS 124, and the BS 110 may change over time as the first MS 131 to the fourth MS 134 move within a network coverage area or join and leave the mobile communication network 100.

In an example, radio resources in the mobile communication network 100 are allocated through a two-stage scheduling procedure. In a first stage and in a centralized fashion, a BS initially allocates resources to MSs by obtaining scheduling parameters for each of the MSs in a network sector controlled by the BS. The BS allocates resources to the MSs associated directly with the BS and to all RSs operating within the network sector corresponding to the BS.

In a second stage, post-processing is performed at a relay station, for example, to obtain updated scheduling parameters. In contrast to a centralized scheduling method in which only a BS performs scheduling, methods according to various examples may be referred to as semi-centralized scheduling methods.

In one illustrative configuration, when scheduling parameters are updated at an RS, the latest feedback information on a channel state is used. For example, in a relay chain with an order including a BS, an RS, and an MS, the RS is defined to be closer to the MS than to the BS. A time delay in which the RS receives feedback information from the MS is less than a delay experienced by the BS. Accordingly, feedback information available from the RS may be more up-to-date than feedback information available from the BS. In an example of multi-hop relaying transmission in which several relays are sequentially involved in a transmission process, and in another example of fast fading channels, for example, when an MS rapidly travels, a time delay in feedback information from relays is longer. Accordingly, semi-centralized scheduling methods may be used to obtain updated scheduling parameters that are better suited for current channel conditions.

In addition, when second-stage scheduling is performed, the RS may also relay the feedback information on the channel state back to the BS, or to another RS at a higher up order in the relay chain than the RS. Because scheduling parameters are to be updated at the RS, it is less critical for the BS to be provided with accurate feedback information compared with the centralized scheduling method. Therefore, channel state information is quantized before being fed back along the relay chain, and a number of bits to be transmitted as feedback information and system overheads are reduced.

The mobile communication network 100 may be, for example, a Long Term Evolution (LTE) network, however, there is no limitation to the LTE network. Accordingly, the mobile communication network 100 may be applicable to all types of relay-based networks. Various examples in the present disclosure may be applied to various types of network, for example, a Worldwide Interoperability for Microwave Access (WiMAX) network configured based on the Institute of Electrical and Electronics Engineers (IEEE) 802.16m standard, a mesh network configured based on the IEEE 802.15.5 Wireless Personal Area Network (WPAN) standard, and a Body Area Network (BAN) configured based on the IEEE 802.15.6 standard; however, there is no limitation thereto.

Figure 2:
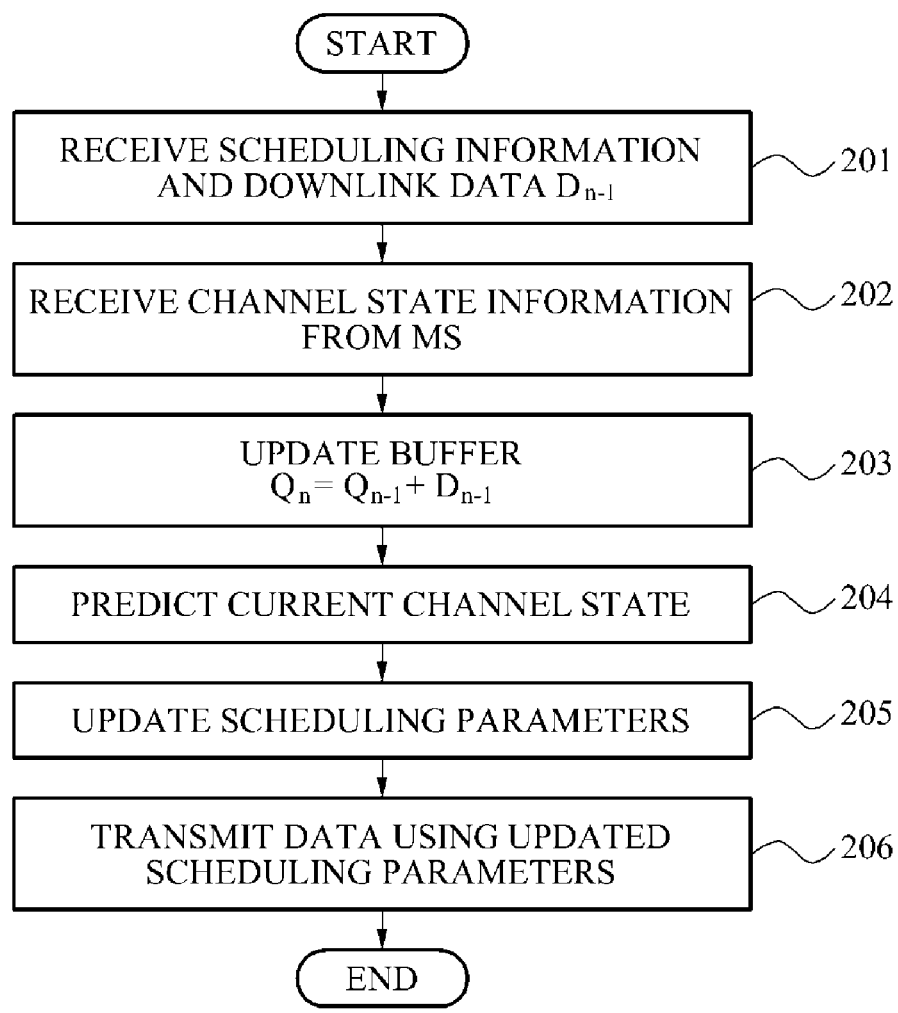
FIG. 2 is a flowchart illustrating an example of a method performing scheduling at a relay station (RS), in accordance with an embodiment.

FIG. 2 illustrates an example of a method performing scheduling at the RS, in accordance with an embodiment.

When a BS performs first-stage centralized scheduling, one of the RSs of FIG. 1 performs second-stage scheduling.

To perform first-stage scheduling, a BS receives delayed channel state information from an MS through one or more RSs. In an example, the channel state information includes a Channel Quality Indicator (CQI). The channel state information may include a numerical value of the CQI, or other suitable information to allow the BS to identify a numerical value, for example an index corresponding to one of a plurality of predefined quantization levels. In another example, instead of or in addition to the CQI, the channel state information may include one or more channel quality metrics. The channel quality metric may include, for example, a Signal-to-Noise Ratio (SNR), a Signal-to-Interference-plus-Noise Ratio (SINR), a physical Carrier to Interference-plus-Noise Ratio (CINR), an effective CINR, Multiple-In and Multiple-Out (MEMO) mode selection, and frequency selective sub-channel selection; however, there is no limitation thereto. The BS may similarly obtain channel state information for all other users, for example the MS, and the one or more RSs, within the BS sector.

The BS performs a centralized scheduling to achieve a fair allocation of resources. In an example, in a network operating based on a Decode-and-Forward (DF) relay scheme, the centralized scheduling allocates a frequency bandwidth (BW) and identifies most efficient modulation (MOD) and channel coding rate (COD) schemes for each channel to ensure a maximum throughput at a user end. Through the above operation, scheduling parameters are obtained for each user. Scheduling information used to define the obtained scheduling parameters is forwarded to apparatuses within the network, for example MSs and RSs, through one or more corresponding intermediate RSs.

When the BS performs the first-stage scheduling, an RS in a mobile communication network performs the second-stage scheduling using the method of FIG. 2.

Referring to FIG. 2, in operation 201, the RS receives scheduling information and downlink data $D_{n-1}$. In an example, the BS transmits the scheduling information to the RS. The scheduling information defines scheduling parameters that are allocated by the BS during the first-stage scheduling. In another example, another RS, for instance, an intermediate RS, transmits the scheduling information to the RS. The scheduling information defines updated scheduling parameters that are obtained at the intermediate RS. The scheduling parameters may be used to control downlink transmission of data over a communication link between the RS and an apparatus associated with the RS, for example an MS. The RS stores the downlink data $D_{n-1}$ in a buffer, before the downlink data $D_{n-1}$ is transmitted to the MS.

In operation 202, the RS receives channel state information as feedback from the MS. The channel state information may include information on a communication state of a communication channel between the RS and the MS. As shown in FIG. 2, the channel state information is received after the scheduling information is received; however there is no limitation thereto. Accordingly, operations 201 and 202 may be generally performed in a reverse order, or at the same time. The channel state information may indicate that the state of the communication channel between the RS and the MS in a previous time period is congested or busy producing transmission and processing delays.

In operation 203, the buffer in the RS is updated by adding the received downlink data $D_{n-1}$ to data $Q_{n-1}$ that is already queued in the buffer. When the received downlink data $D_{n-1}$ is coded, for example, when the RS operates based on the DF relay scheme, the received downlink data $D_{n-1}$ is decoded using MOD and COD schemes indicated in the received scheduling information, before the buffer is updated with decoded data. For example, the buffer is updated at a predetermined point in time between operation 201, in which the downlink data $D_{n-1}$ is received, and operation 205, in which the scheduling parameters are updated.

In operation 204, the RS obtains predicted channel state information of a state of the communication channel in a current time period, based on the received channel state information. For example, the channel state information is predicted based on previous or past feedback information that is pre-stored, and a prediction process identifies channel behaviors from predefined channel models.

In operation 205, the RS obtains updated scheduling parameters based on the predicted channel state information. In an example, operation 204 may be omitted, and the scheduling parameters may be updated based on the received channel state information. For example, in a condition in which the channel state slowly changes (for example, a stationary MS), the received channel state information may be assumed to be a good approximation to a current channel state. In another example, channel feedback fluctuations show random behaviors. In this example, to obtain the updated scheduling parameters, the RS uses the received channel state information, instead of performing prediction.

In operation 205, the scheduling parameters may be updated based on, for example, one of a round-robin process, a proportional fairness process, and an adaptive proportional fairness process.

Additionally, in operation 205, the RS obtains the updated scheduling parameters, based on the received scheduling information and an amount of the updated data for downlink transmission that is currently stored in the buffer. In an example, during updating of the scheduling parameters, the RS may retain the BW allocated by the BS, but may acquire new MOD and COD schemes when a higher throughput is achieved under current channel conditions in which the new MOD and COD schemes require an amount of data that is less than or equal to the amount of data currently stored in the buffer.

Based on feedback information of the channel state that is more up-to-date than feedback information available in the BS during the first-stage scheduling, and based on a current state of a local buffer, the RS maximizes a throughput by obtaining updated scheduling parameters that are better suited for current conditions than those initially allocated by the BS, during the first-stage scheduling.

In operation 206, at least a portion of the downlink data, updated in operation 205, stored in the buffer is transmitted to the MS, based on the updated scheduling parameters. The downlink data may be transmitted by packaging data based on the updated scheduling parameters, and by transmitting the packaged data.

Figure 3:
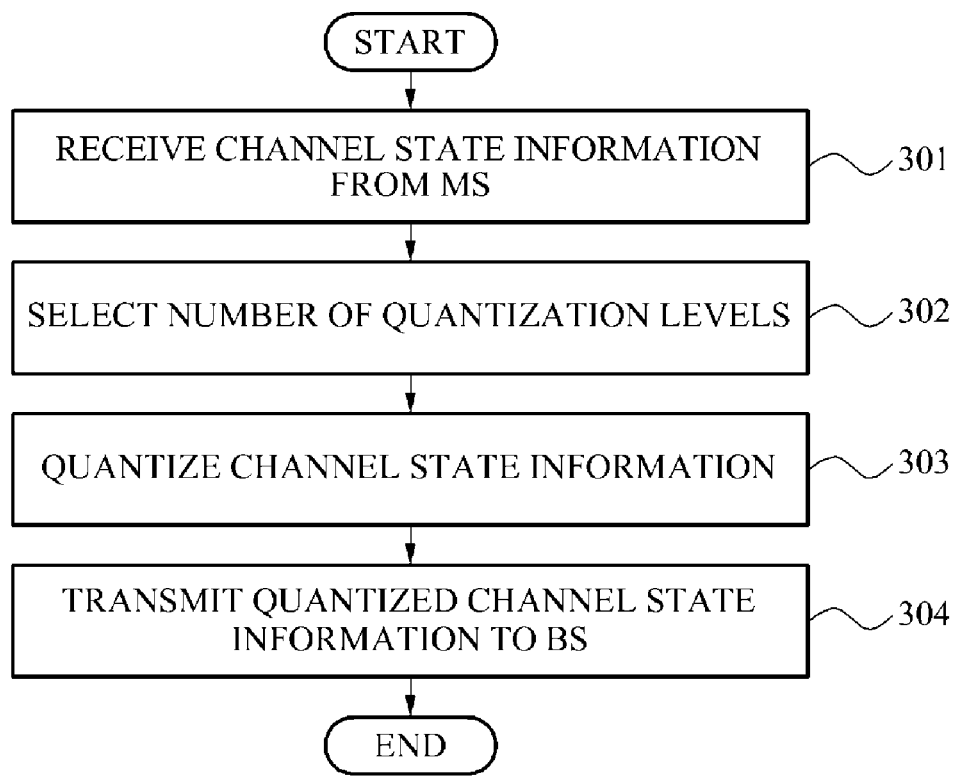
FIG. 3 is a flowchart illustrating an example of a method providing quantized channel state as feedback at the RS, in accordance with an embodiment.

FIG. 3 illustrates an example of a method providing quantized channel state as feedback at the RS, in accordance with an embodiment.

Referring to FIG. 3, in operation 310, channel state information is received from an apparatus, such as an MS, associated with the RS. In an example, the channel state information may include, for example, a CQI value. Operation 301 may correspond to operation 202 of FIG. 2. In operation 302, a number of predefined quantization levels are selected within a range of values. The quantization levels may be evenly spaced within the range of values.

For example, when the number of quantization levels to be selected increases, an interval between the quantization levels may be reduced, and a quantized CQI may be closer to the original value. However, in this example, a number of bits required to transmit the quantized CQI increases. To reduce a volume of data to be transmitted over a network as channel feedback information, a lower number of predefined quantization levels are selected in operation 302, as an example of a higher number of hops on a multi-hop chain between an MS and a BS, and/or as an example of higher channel fading conditions. Under each of the above conditions, it is less important to provide less accurate feedback to the BS or intermediate RSs further along a chain, because the channel state information is more likely to be out of date by a time in which the channel state information is received.

In an example, operation 302 may be omitted, and a predetermined fixed number of quantization levels may be used.

In operation 303, the CQI value is quantized by adjusting the received channel state information to one of a plurality of predefined quantization levels. In operation 304, the quantized CQI value is transmitted to a BS or an intermediate RS.

Figure 4:
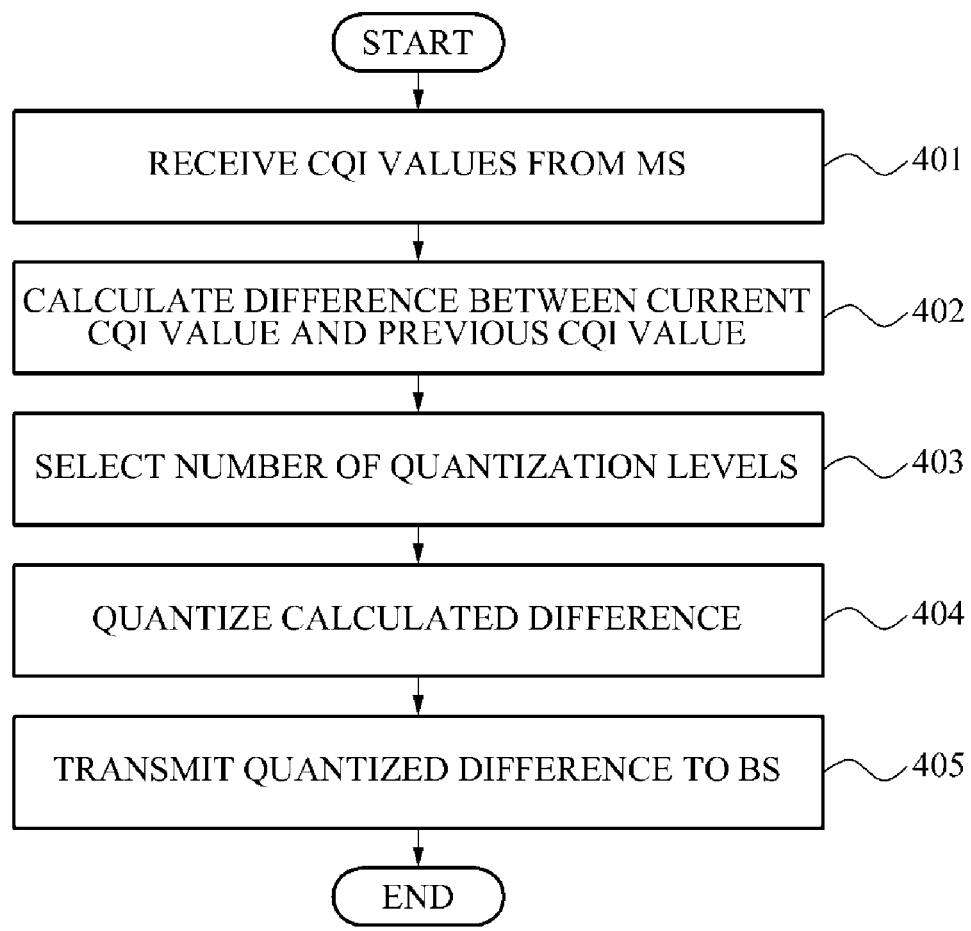
FIG. 4 is a flowchart illustrating an example of a method providing channel state as feedback at the RS, based on a difference between a current value and a previous value of channel state information, in accordance with an embodiment.

FIG. 4 illustrates an example of a method providing channel state as feedback at an RS, based on a difference between a current value and a previous value of channel state information, in accordance with an embodiment.

Operations 401, 403, 404 and 405 of FIG. 4 may be similar to operations 301 through 304 of FIG. 3, respectively, and accordingly further description thereof will be omitted herein. However, unlike the method of FIG. 3, a difference between a current CQI value $CQI_n$ and a CQI value that is previously transmitted to a BS may be calculated in the method of FIG. 4. The channel state information may be, for example, a CQI value. However, the method of FIG. 4 may be used for all channel quality metrics, for example, a quantified numerical value representing measurement of a channel quality. The difference indicated by $\Delta CQI$ is quantized and transmitted. A value of the difference $\Delta CQI$ may be substantially smaller than an absolute value of the CQI because fewer bits may be required to transmit the value of the difference $\Delta CQI$ than to transmit an actual CQI value.

In an example, when operations 403 and 404 are omitted, the value of the difference $\Delta CQI$ may be transmitted without quantization.

The methods of FIGS. 3 and 4 enable the number of bits required when transmitting channel state information as feedback to apparatuses further along a chain (for example, a BS or intermediate RSs). An RS may use the method of FIG. 3 or 4 to provide feedback at a predetermined time after receiving the channel state information in operation 202 of FIG. 2. The method of FIG. 3 or 4 may be performed before, after, or at substantially the same time as, operations 204 through 206 of FIG. 2.

Figure 5:
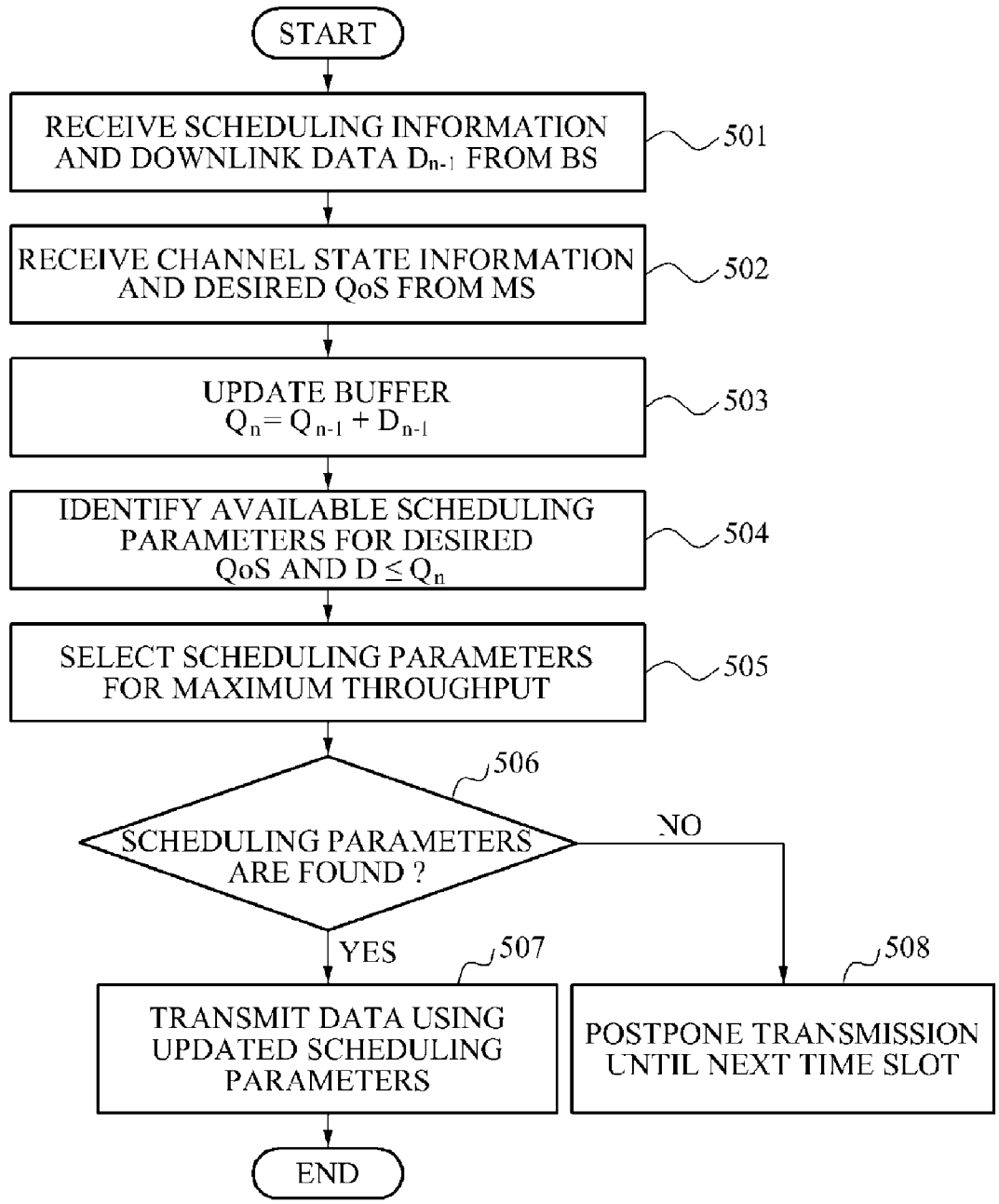
FIG. 5 is a flowchart illustrating another example of a method performing scheduling at the RS, in accordance with an embodiment.

FIG. 5 illustrates another example of a method performing scheduling at the RS, in accordance with an embodiment.

Referring to FIG. 5, in operation 501, scheduling information is received from a BS or an intermediate RS, similarly to operation 201 of FIG. 2. In addition, downlink data $D_{n-1}$ to be transmitted to an apparatus associated with the RS is also received. The apparatus associated with the RS may include, for example, an MS or the intermediate RS.

In operation 502, channel state information is received from the apparatus associated with the RS, similarly to operation 202 of FIG. 2, operation 301 of FIG. 3 and operation 401 of FIG. 4. In addition, information on a desired Quality of Service (QoS) or a determined Quality of Service (QoS) desired by the apparatus is also received from the apparatus associated with the RS.

In operation 503, a buffer is updated by adding the received downlink data $D_{n-1}$ to data $Q_{n-1}$ that is already queued in the buffer. Operation 503 may correspond to operation 203 of FIG. 2, and the method of FIG. 5 may also include decoding received data if required, for example, when the RS operates based on a DF relay scheme.

In operation 504, available scheduling parameters are identified, which require an amount of data that is less than or equal to an amount of data currently stored in the buffer ($D \leq Q_n$), and that provide the desired QoS requested by the apparatus. In an example, instead of allowing the apparatus to request the desired QoS, the RS may select updated scheduling parameters that provide a predefined QoS. For example, a predefined QoS level may be set based on a common Block Error Rate (BLER), to ensure a predetermined level of successful decoding at a receiver, for example an MS or another RS.

In an example, the scheduling parameters include a BW allocation, a MOD scheme and a COD scheme, and are updated by obtaining new MOD and COD schemes while retaining the originally allocated BW. In another example, a BW may be re-allocated when the scheduling parameters are updated. For example, when an RS is associated with a plurality of apparatuses, for example an MS and another RS, the BW is re-allocated among the apparatuses by reducing a BW allocated to one of apparatuses with a poor channel state and increasing a BW allocated to one of apparatuses with a better channel state. Accordingly, scheduling is efficiently performed because a BW allocated to a user with a poor channel state is re-allocated to another user with a better channel state. When a BW is re-allocated among a plurality of users, the RS maximizes an overall system capacity, instead of maximizing an individual user's throughput.

In operation 505, scheduling parameters are selected, which provide a maximum throughput, from a set of the available scheduling parameters identified in operation 504. The scheduling parameters are selected based on a throughput; however, there is no limitation thereto. In an example, a different predetermined condition may be used to select the scheduling parameters in operation 505. For example, parameters that provide a highest QoS may be selected.

In operation 506, when the scheduling parameters are found, in operation 507, at least a part of data is transmitted based on the updated scheduling parameters. For example, when all of the data is not transmitted, unsent data may be retained or stored in the buffer, and may be sent at a later time when a better channel state occurs that allows higher-throughput MOD and COD schemes to be used.

In an example in which suitable scheduling parameters are not found in operations 504 and 505, for example, when there is no available scheduling parameter that provides the desired QoS and that requires $D \leq Q_n$, in operation 508, the RS postpones transmission until a next time slot. For example, instead of postponing transmission, the RS transmits the data by using other scheduling parameters, for example parameters defined in the received scheduling information, or by selecting updated parameters that provide a lower QoS than that requested by the apparatus.

The updated scheduling parameters may also be selected based on a BW allocated to the MS by the BS, by ensuring that only scheduling parameters enabling BW allocation may be selected.

In the method of FIG. 5, in operations 504 and 505, the buffer is updated before the second-stage scheduling. In another example, the updated scheduling parameters may be obtained, instead of first updating the buffer. For example, when buffer overflows occur, it may not be possible to add new data to the buffer until data that is already stored in the buffer has been transmitted. Therefore, operation 503 may be omitted, if necessary.

Figure 6:
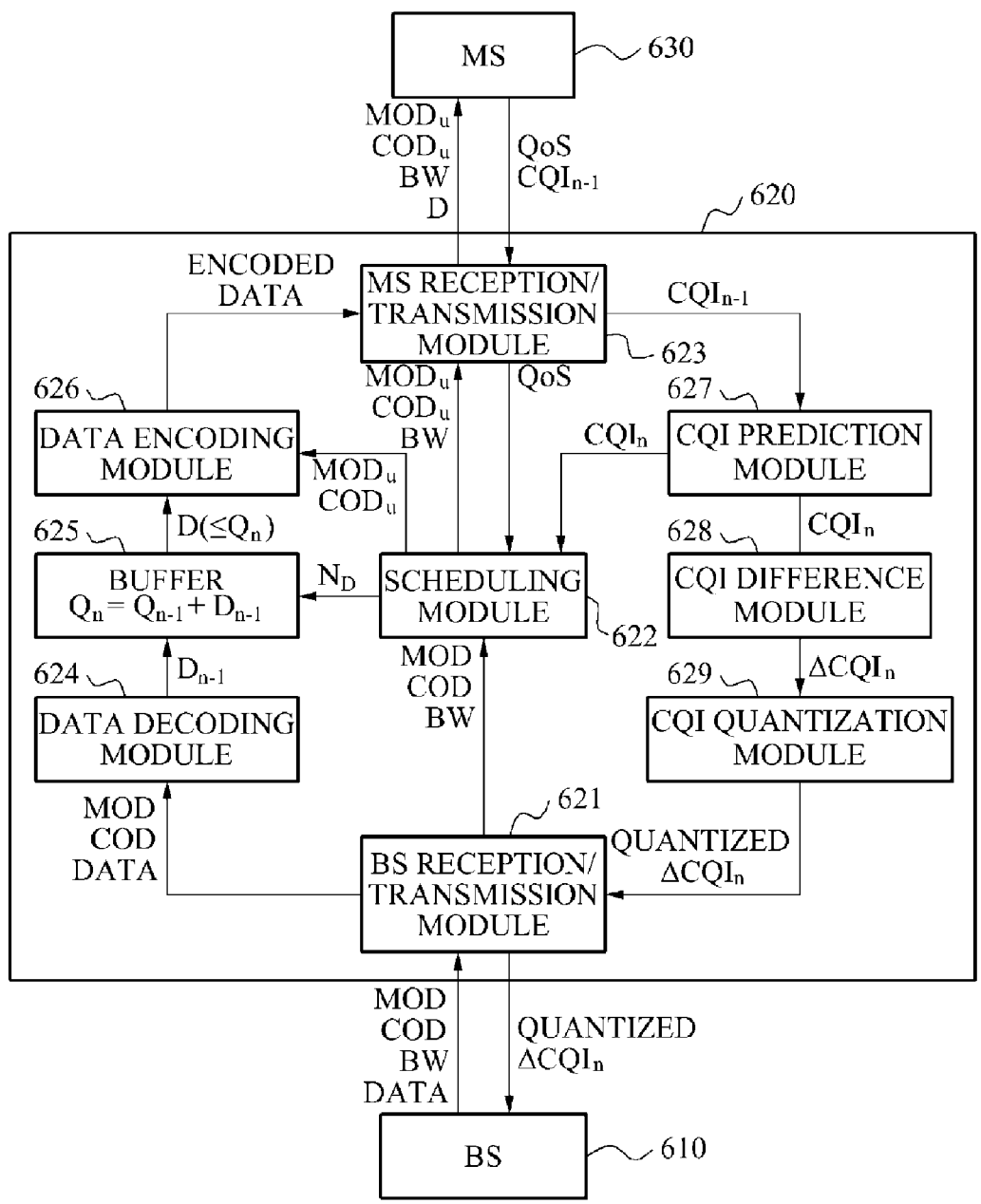
FIG. 6 is a diagram illustrating an example of the RS configured to perform scheduling based on a Decode-and-Forward (DF) relay scheme, in accordance with an embodiment.

FIG. 6 illustrates an example of the RS configured to perform scheduling based on a DF relay scheme, in accordance with an embodiment.

Referring to FIG. 6, an RS 620 is configured to perform scheduling. Predetermined modules shown in FIG. 6 may be embodied as a single hardware processor, or as physically separate hardware components. The RS 620 may be configured to operate based on a DF relay scheme.

The RS 620 includes a BS reception and/or transmission (reception/transmission) module 621 configured to communicate with a BS 610, a scheduling module 622 configured to obtain updated scheduling parameters, and an MS reception/transmission module 623 configured to communicate with an MS 630. Both the BS reception/transmission module 621 and the MS reception/transmission module 623 may be used to perform communication between the BS 610 and the MS 630. Although the BS reception/transmission module 621 and the MS reception/transmission module 623 are separately illustrated in FIG. 6, both modules 621 and 623 may be configured as a single reception/transmission module.

Additionally, the RS 620 communicates with the BS 610 and the MS 630, as shown in FIG. 6. In other examples, one or both of the BS 610 and MS 630 may be replaced with another RS.

The scheduling module 622 may perform second-stage scheduling based on one of the above-described methods, by updating received scheduling parameters. In FIG. 6, the subscript "U" denotes updated scheduling parameters, for example, $MOD_U$, $COD_U$ and $BW_U$.

The RS 620 further includes a data decoding module 624 configured to demodulate and decode data received from the BS 610, based on a MOD scheme and COD scheme indicated in the received scheduling parameters. In an example, the data decoding module 624 may be omitted when the RS 620 operates based on an Amplify-and-Forward (AF) relay scheme or a Compress-and-Forward (CF) relay scheme. Also, the RS 620 further includes a buffer 625 for the MS 630 associated with the RS 620, and a data encoding module 626. The buffer 625 is configured to store downlink data $Q_n$ to be transmitted to the MS 630. The data encoding module 626 is configured to encode and modulate data D output from the buffer 626 before the data D is transmitted to the MS 630. As shown in FIG. 6, the scheduling module 622 controls the buffer 625 to output the data D by transmitting to the buffer 625 information about an amount $N_D$ of data to be transmitted in a current time slot. The buffer 625 outputs the data D indicated by the scheduling module 622. An amount of the data D may be less than or equal to a total amount of data $Q_n$ queued in the buffer 625. During encoding of the data D, the scheduling module 622 may inform the data encoding module 626 of an updated MOD scheme $MOD_U$, and an updated COD scheme $COD_U$ that are to be used.

In addition, the RS 620 further includes a CQI prediction module 627, a CQI difference module 628, and a CQI quantization module 629, which are configured to provide channel state information as feedback to the BS 610 (or an intermediate RS), similarly to the method of FIG. 3 or 4. As described above, the channel state information may include, for example, a CQI value, however, there is no limitation thereto. Accordingly, different types of channel state information may be used.

As described above with reference to FIGS. 2 through 4, predetermined operations, for example CQI prediction, difference calculation and quantization may be omitted. Accordingly, at least one of the CQI prediction module 627, the CQI difference module 628, and the CQI quantization module 629 may be omitted. In an example, when the RS 620 operates based on the DF relay scheme, the data decoding module 624 and the data encoding module 626 may be included in the RS 620. In another example, when the RS 620 operates based on the other relay schemes, the data decoding module 624 and the data encoding module 626 may be omitted.

Figure 7:
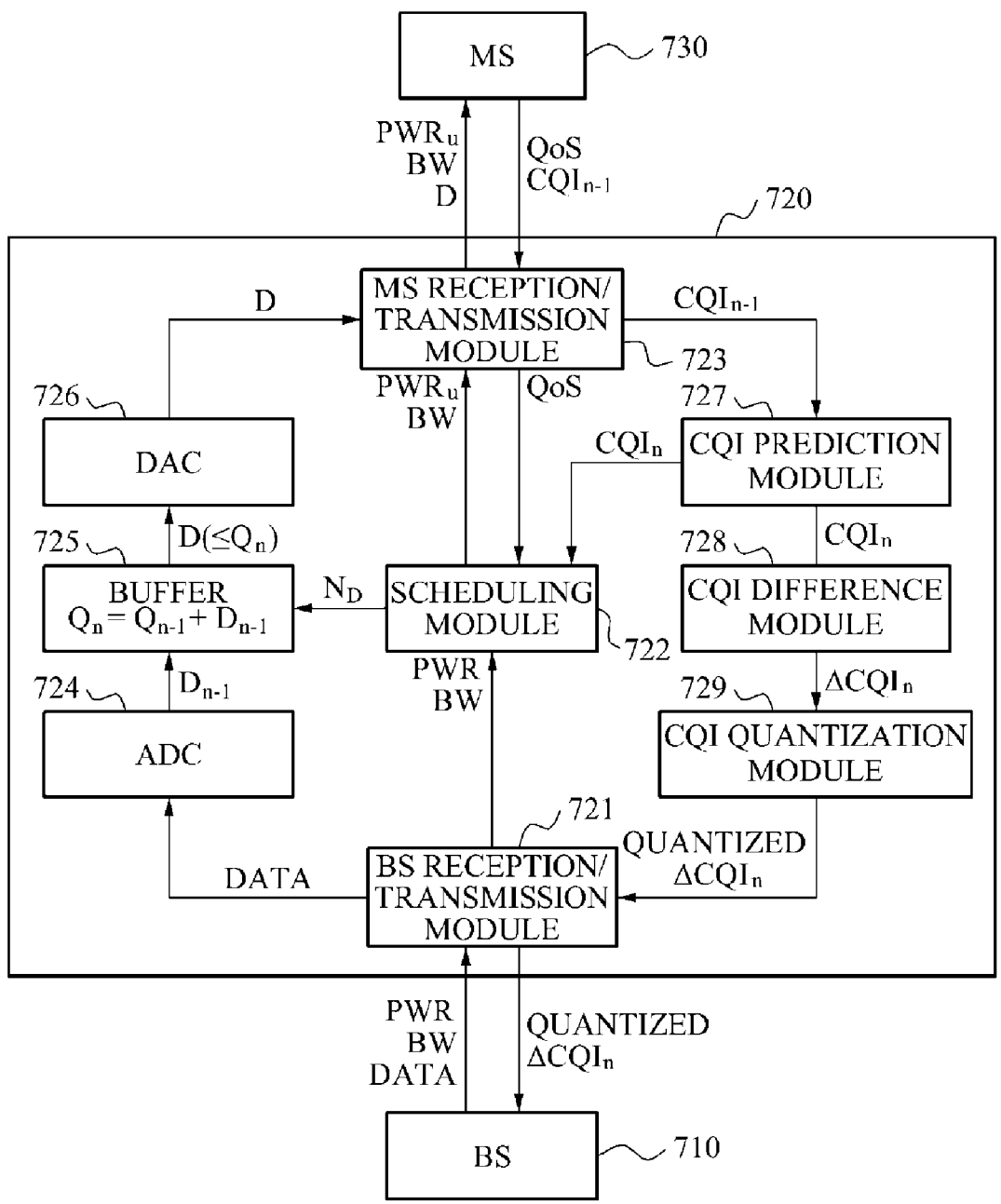
FIG. 7 is a diagram illustrating an example of the RS configured to perform scheduling based on an Amplify-and-Forward (AF) relay scheme, in accordance with an embodiment.

FIG. 7 illustrates an example of the RS configured to perform scheduling based on an AF relay scheme, in accordance with an embodiment.

Referring to FIG. 7, an RS 720 is configured to perform scheduling. Similarly to FIG. 6, predetermined modules shown in FIG. 7 may be embodied as a single processor, or as physically separate hardware components.

The RS 720 is configured to operate based on an AF relay scheme. Similarly to the RS 620 of FIG. 6, the RS 720 includes a BS reception/transmission module 721 configured to communicate with a BS 710, a scheduling module 722, an MS reception/transmission module 723 configured to communicate with an MS 730, a buffer 725, a CQI prediction module 727, a CQI difference module 728, and a CQI quantization module 729.

Because the RS 720 operates based on the AF relay scheme, instead of a DF relay scheme, the RS 720 includes an analog-to-digital converter (ADC) 724 instead of a data decoding module, and a digital-to-analog converter (DAC) 726 instead of a data encoding module. The ADC 724 digitizes received analog data to store digital data in the buffer 725, and the DAC 726 may convert digital data D output from the buffer 725 into analog data to be transmitted. The MS reception/transmission module 723 may amplify the analog data based on updated transmission power $PWR_U$ set by the scheduling module 722, and a BW allocated to the MS 730 by the BS 710.

In an example, as described above with reference to FIGS. 6 and 7, an RS may retain a BW allocated to an MS by a BS, during updating of received scheduling parameters for the MS. However, as described above, in various examples, an RS may re-allocate a BW among a plurality of apparatuses associated with that RS.

Figure 8:
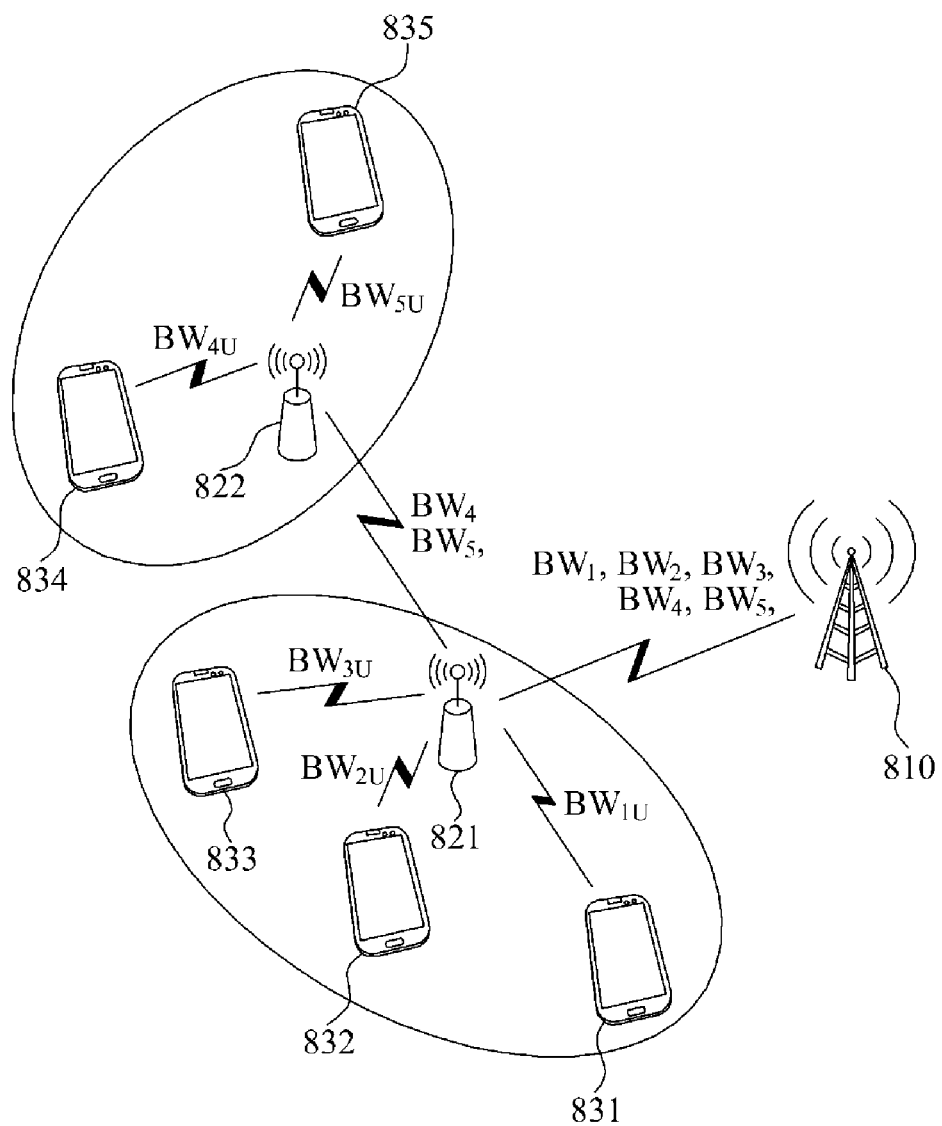
FIG. 8 is a diagram illustrating an example of a mobile communication network in which frequency bandwidths (BWs) are re-allocated by the RS, in accordance with an embodiment.

FIG. 8 illustrates an example of a mobile communication network in which BWs are re-allocated by an RS. For clarity, only BW allocations among scheduling parameters will be described herein, but scheduling parameters may include other parameters, such as MOD, COD or PWR parameters.

Referring to FIG. 8, the mobile communication network includes a BS 810, a first RS 821, a second RS 822, a first MS 831, a second MS 832, a third MS 833, a fourth MS 834, and a fifth MS 835. The first MS 831 to the third MS 833 are associated with the first RS 821, and the fourth MS 834 and the fifth MS 835 are associated with the second RS 822. The BS 810 allocates a first BW, $BW_1$, to the first MS 831, allocates a second BW, $BW_2$, to the second MS 832, allocates a third BW, $BW_3$, to the third MS 833, allocates a fourth BW, $BW_4$, to the fourth MS 834, and allocates a fifth BW, $BW_5$, to the fifth MS 835.

The BS 810 transmits the allocated first BW, $BW_1$, to the allocated fifth BW, $BW_5$, as scheduling parameters to the first RS 821. When updated scheduling parameters are obtained during second-stage scheduling, the first RS 821 re-allocates the first BW, $BW_1$, to the third BW, $BW_3$, among the first MS 831 to the third MS 833, and obtains updated BWs $BW_{1U}$, $BW_{2U}$, and $BW_{3U}$. The first RS 821 does not re-allocate BWs to apparatuses that are not associated with the first RS 821, for example, the fourth MS 834 and the fifth MS 835. For the apparatuses, the first RS 821 retains BWs that are originally allocated to the apparatuses, for example the fourth BW, $BW_4$, and the fourth BW, $BW_5$, and transmits the BWs to the second RS 822. Accordingly, interference may be prevented from occurring between apparatuses in neighboring cells, because each RS only alters BW usage within its own cell.

The second RS 822 obtains updated BWs, $BW_{4U}$ and $BW_{5U}$, and may re-allocate the updated BWs, $BW_{4U}$ and $BW_{5U}$, to the fourth MS 834 and the fifth MS 835. FIG. 8 illustrates a two-hop relay chain; however, there is no limitation thereto. Accordingly, it will be understood that the above principle may be extended to relay chains of variable lengths.

Figure 9:
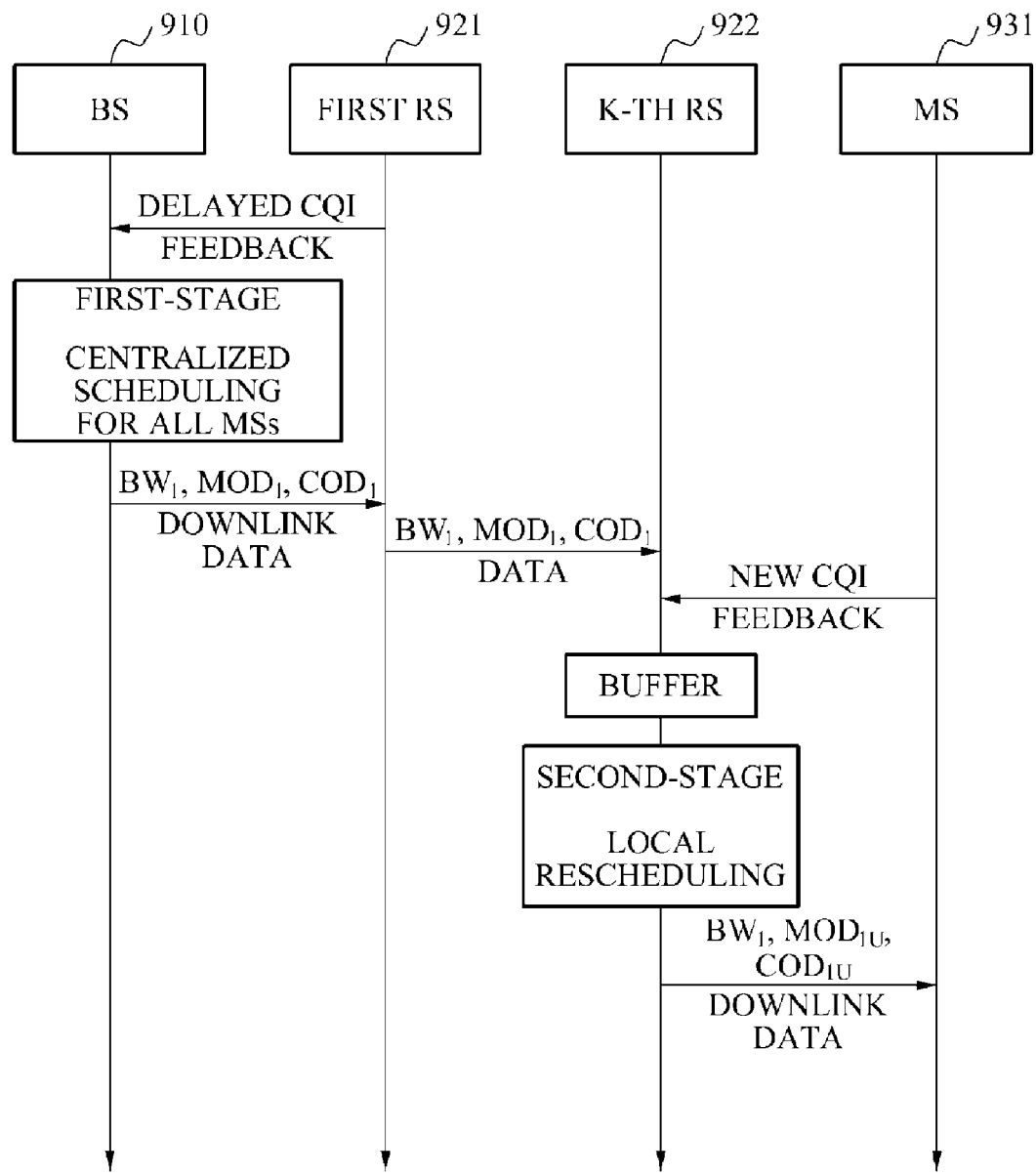
FIG. 9 is a flowchart illustrating an example of a timeline showing a two-stage scheduling process, in accordance with an embodiment.

FIG. 9 illustrates an example of a timeline showing a two-stage scheduling process, in accordance with an embodiment.

In FIG. 9, operations are performed in a network by a BS 910, a first RS 921, a k-th RS 922, and an MS 931. In an example, the network may operate based on a DF relay scheme, channel state feedback may be provided in the form of a quantized CQI change value ΔCQI, and RSs may not re-allocate BWs. However, as described above, the above description and various configurations are not limited to these examples.

The BS 910 receives delayed channel state information for each of MSs associated with the BS 910, for example, the MS 931, and performs first-stage centralized scheduling for all of the MSs. The BS 910 obtains scheduling parameters $BW_1$, $MOD_1$, and $COD_1$ for the MS 931. The BS 910 transmits the scheduling parameters $BW_1$, $MOD_1$, and $COD_1$ to the first RS 921, along with downlink data for transmission to the MS 931.

The first RS 921 forwards the scheduling parameters $BW_1$, $MOD_1$, and $COD_1$ and downlink data along a relay chain to the k-th RS 922, which is a serving RS for the MS 931. In this example, scheduling parameters for an MS are updated by a serving RS for the MS. In another example, the scheduling parameters are updated in a progressive fashion by each relay along a relay chain including a BS, a first RS, a k-th RS and an MS.

The k-th RS 922 receive the scheduling parameters $BW_1$, $MOD_1$, and $COD_1$ and downlink data, and also receive a new CQI as feedback from the MS 931. The k-th RS 922 updates a local buffer for the MS 931 with new downlink data, and performs second-stage scheduling to obtain an updated MOD parameter $MOD_{1U}$ and updated COD parameter $COD_{1U}$ for the MS 931. Referring to FIG. 9, CQI feedback available to the k-th RS 922 during the second-stage scheduling is more up-to-date than CQI feedback available to the BS 910 during the first-stage scheduling.

The k-th RS 922 transmits the downlink data from the buffer to the MS 931, based on the scheduling parameter $BW_1$ originally allocated, the updated MOD parameter $MOD_{1U}$, and the updated COD parameter $COD_{1U}$.

In a network standard, for example, an LTE-Advanced, and WiMAX IEEE 802.16m, from a physical layer perspective, an RS may operate in one of two modes, for example, a non-transparent (NT)-RS mode and a transparent (T)-RS mode. An NS-RS and a T-RS may be referred to as a Type-I RS and a Type-II RS, respectively. The NT-RS may be used to extend signal and service coverage, and may transmit a preamble and other broadcast messages as well as relaying data traffic. The T-RS may be used to improve a service quality and a link capacity through multipath diversity for an MS, which also has a direct link to a BS. However, the T-RS may only relay data traffic, and the MS may receive control signals directly from the BS. Because the T-RS is not able to generate or amend control messages generated by the BS, the T-RS may not participate in scheduling. Therefore, in a network that features both the Type-I RS and Type-II RS, it is possible to perform scheduling at the NT-RS, not at the T-RS.

In a simulation of an Above Rooftop (ART) relaying scenario in a WiMAX system with 19 cells in which 20 MSs are associated with a serving node in each sector, semi-centralized scheduling methods, as described above, may achieve a gain of about 9% in terms of an average throughput per cell, when considering only data delivered by relays. The simulation is performed for a simple three-hop scenario with slow fading channels, and a larger gain may be expected in real world situations with more hops between a BS and an MS and/or rapidly fading channels.

As described above, according to various examples, an RS operates based on a DF relay scheme, and new modulation and coding schemes are obtained when scheduling parameters are updated. However, in other examples, a second-stage scheduling procedure is performed by an RS operating based on different relay schemes.

In an example, in an AF relay scheme, the RS does not perform demodulation and decoding. As a result, it is not possible to alter a MOD scheme and COD scheme. When the RS operates based on the AF relay scheme, a new BW and power allocation is obtained when scheduling parameters are updated.

In another example, when the RS operates based on a CF relay scheme, a new BW and modulation scheme may be obtained when scheduling parameters are updated.

According to various examples, an RS performs a second-stage scheduling procedure. In multi-hop chains including a plurality of intermediate RSs, second-stage scheduling for an MS is performed by a serving RS, that is, an RS with which the MS is associated. In the alternative, the second-stage scheduling for an MS is performed by the serving RS in a progressive manner by performing second-stage scheduling at each intermediate RS along a chain, in turn.

By updating scheduling parameters at an RS in a mobile communication network, a number of advantages may be achieved compared to a centralized scheduling method. System throughput is improved because more up-to-date feedback is available at an RS level, and available buffers at relays are exploited to avoid transmitting data over corrupted links, without having to exchange buffer state information with a BS.

In accordance with a configuration, data is not sent over a corrupted channel and as a result to improve energy efficiency. Thus, it is possible to reduce reoccurrence of a hybrid automatic repeat request (HARQ), that is, a request for resending failed frames. Additionally, when rescheduling is performed at an RS, it is not necessary to provide accurate channel state feedback to a BS, because a refined second stage rescheduling stage is performed at a relay level. The RS only needs to send quantized and differential estimations on channel states, instead of accurate values, which may indicate that fewer bits are needed to convey a channel state. Accordingly, it is possible to reduce an amount of data overhead on a system.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The modules and apparatuses described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method to perform scheduling at a relay station (RS), the method comprising:
   receiving, by the RS, channel state information from a mobile station (MS) and scheduling information from a base station (BS), the scheduling information comprising scheduling parameters for downlink transmission of downlink data; and
   updating, by the RS, the received scheduling parameters based on the scheduling information, the channel state information, and an amount of the downlink data;
   transmitting, by the RS, a portion of the downlink data to the MS based on the updated scheduling parameters.

2. The method of claim 1, wherein the updating comprises identifying available scheduling parameters that require an amount of data that is less than or equal to the amount of the data; and
   selecting the updated scheduling parameters from among the available scheduling parameters based on a condition.

3. The method of claim 2, wherein the selecting comprises at least one of
   selecting the updated scheduling parameters that provide a maximum throughput from among the available scheduling parameters; or
   selecting the updated scheduling parameters that provide a determined Quality of Service (QoS).

4. The method of claim 1, further comprising:
   calculating a difference between a current value of a channel quality metric and a previously received value of the channel quality metric, the channel state information comprising the channel quality metric; and
   transmitting the difference as the channel state information to at least one of the base station (BS) or an intermediate RS.

5. The method of claim 1, further comprising:
   quantizing the channel state information by adjusting the channel state information to one of defined levels; and
   transmitting the quantized channel state information to at least one of the base station (BS) or an intermediate RS.

6. The method of claim 5, further comprising:
   selecting at least one of a lower number of the defined levels for a higher number of hops on a multi-hop chain between the mobile station (MS) and the base station (BS), or a lower number of the defined levels for higher channel fading conditions.

7. The method of claim 1, further comprising:
   obtaining predicted channel state information of a state of a communication channel between the RS and an apparatus in a current time period based on the received channel state information,
   wherein the channel state information comprises information on a state of the communication channel in a previous time period, and
   wherein the received scheduling parameters are updated based on the predicted channel state information.

8. The method of claim 1, wherein the RS operates based on a decode-and-forward (DF) relay scheme, and
   wherein the updating further comprises obtaining a new modulation scheme and a new coding scheme.

9. (BW) allocated to an apparatus, and the defined BW is retained in response to the updating of the received scheduling parameters.

10. The method of claim 1, wherein the scheduling information is used to define a bandwidth (BW) allocated to an apparatus, and
    wherein the updating comprises obtaining a new BW for the apparatus from BWs re-allocated to apparatuses.

11. The method of claim 1, further comprising:
    receiving downlink data; and
    adding the downlink data to a buffer, prior to updating the received scheduling parameters.

12. A relay station (RS), comprising:
    one or more hardware processors coupled to a memory, wherein the memory stores:
    a reception module configured to receive channel state information from a mobile station (MS) and scheduling information from a base station (BS), the scheduling information comprising scheduling parameters for downlink transmission of downlink data; and
    a scheduling module configured to update the received scheduling parameters based on the scheduling information, the channel state information, and an amount of the downlink data;
    a transmitter configured to transmit a portion of the downlink data to the MS based on the updated scheduling parameters.

13. The RS of claim 12, wherein the scheduling module is further configured to:

identify available scheduling parameters that require an amount of data that is less than or equal to the amount of the data, and select the updated scheduling parameters from among the available scheduling parameters based on a condition.

14. The RS of claim 12, wherein the memory further stores:

a difference calculating module configured to calculate a difference between a current value of a channel quality metric and a previously received value of the channel quality metric, the channel state information comprising the channel quality metric; and a transmission module configured to transmit the difference as the channel state information to at least one of the base station (BS) or an intermediate RS.

15. The RS of claim 12, wherein the memory further stores:

a quantization module configured to quantize the channel state information by adjusting the channel state information to one of defined levels; and a transmission module configured to transmit the quantized channel state information to at least one of the base station (BS) or an intermediate RS.

16. The RS of claim 15, wherein the quantization module is further configured to select a lower number of the defined levels in a situation of at least one of:

a higher number of hops on a multi-hop chain between the mobile station (MS) and the base station (BS), or higher channel fading conditions.

17. The RS of claim 12, wherein the memory further stores:

a prediction module configured to predict the channel state information on a state of a communication channel between the RS and an apparatus in a current time period and based on the received channel state information, wherein the channel state information comprises information on a state of the communication channel in a previous time period, and wherein the scheduling module is further configured to update the received scheduling parameters based on the predicted channel state information.

18. The RS of claim 12, wherein the RS is configured to operate based on a decode-and-forward (DF) relay scheme, wherein the scheduling module is further configured to obtain a modulation scheme and coding scheme among the updated scheduling parameters, wherein the received scheduling information is used to define a bandwidth (BW) allocated to an apparatus, and wherein the scheduling module is further configured to retain the defined BW in response to the received scheduling parameters being updated.

19. The RS of claim 12, wherein the RS is further configured to operate based on an amplify-and-forward (AF) relay scheme, and the scheduling module is further configured to obtain a bandwidth (BW) and power allocation in response to the received scheduling parameters being updated, or wherein the RS is further configured to operate based on a compress-and-forward (CF) relay scheme, and the scheduling module is further configured to obtain the BW and a modulation scheme when the received scheduling parameters are updated.

20. The RS of claim 12, wherein the scheduling module is further configured to update the received scheduling parameters based on at least one of a round-robin process, a proportional fairness process, or an adaptive proportional fairness process.

21. A method of a relay station (RS), comprising:

receiving scheduling information and downlink data from a base station (BS);

receiving channel state information as feedback from a mobile station (MS);

updating pre-stored data with the downlink data;

update scheduling parameters based on the channel state information, the scheduling information, and an amount of the updated data for downlink transmission; and transmitting a portion of the updated data to the MS based on the updated scheduling parameters.

22. The method of claim 21, wherein the scheduling information comprises scheduling parameters or the updated scheduling parameters that are allocated by the base station (BS) or an intermediate RS.

23. The method of claim 21, wherein the channel state information comprises information on a communication state of a communication channel between the RS and the MS.

24. The method of claim 21, further comprising:

obtaining predicted channel state information of a state of a communication channel in a current time period, based on the channel state information, wherein the channel state information is predicted based on pre-stored feedback information; and updating the scheduling parameters based on the predicted channel state information.

25. The method of claim 21, wherein the transmitting of the portion of the updated data comprises packaging data based on the updated scheduling parameters, and transmitting the packaged data.

* * * * *